US011430358B2

(12) United States Patent
Yao et al.

(10) Patent No.: US 11,430,358 B2
(45) Date of Patent: Aug. 30, 2022

(54) FREQUENCY ADJUSTMENT METHOD AND APPARATUS APPLIED TO TERMINAL, AND ELECTRONIC DEVICE

(71) Applicant: Huawei Technologies Co., Ltd., Shenzhen (CN)

(72) Inventors: Xin Yao, Beijing (CN); Chengzhen Wan, Hangzhou (CN); Gang Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/598,024

(22) PCT Filed: Mar. 27, 2019

(86) PCT No.: PCT/CN2019/079953
§ 371 (c)(1),
(2) Date: Sep. 24, 2021

(87) PCT Pub. No.: WO2020/191685
PCT Pub. Date: Oct. 1, 2020

(65) Prior Publication Data
US 2022/0165191 A1 May 26, 2022

(51) Int. Cl.
*G09G 5/00* (2006.01)
*G09G 3/00* (2006.01)

(52) U.S. Cl.
CPC ..... *G09G 3/006* (2013.01); *G09G 2320/0252* (2013.01); *G09G 2320/041* (2013.01);
(Continued)

(58) Field of Classification Search
CPC ...... G09G 3/005; G09G 3/006; G09G 3/3618; G09G 2320/00–106; G09G 2330/021;
(Continued)

(56) References Cited

U.S. PATENT DOCUMENTS

2014/0184619 A1 7/2014 Kim
2017/0124934 A1* 5/2017 Verbeure .............. G09G 3/3611
(Continued)

FOREIGN PATENT DOCUMENTS

CN 103077015 A 5/2013
CN 103366391 A 10/2013
(Continued)

*Primary Examiner* — Sanghyuk Park
(74) *Attorney, Agent, or Firm* — Conley Rose, P.C.

(57) ABSTRACT

A method comprises monitoring a drawing time of a first frame of image, obtaining a current state of a system on chip (SOC) when the drawing time exceeds a first drawing duration, where the current state comprises a current temperature of the SOC and/or a current load of the SOC, determining whether the current state exceeds a first preset threshold, when the current state does not exceed the first preset threshold, increasing an operating frequency of the SOC in a time range, and restoring the operating frequency after the increasing of the operating frequency ends, obtaining actual drawing duration of the first frame of the image when drawing of the first frame of the image is completed, and monitoring a drawing time of a second frame of the image when the actual drawing duration does not exceed second drawing.

20 Claims, 14 Drawing Sheets

(52) U.S. Cl.
CPC .............. *G09G 2330/021* (2013.01); *G09G 2340/0435* (2013.01); *G09G 2360/08* (2013.01)

(58) Field of Classification Search
CPC ....... G09G 2340/0435; G09G 2360/08; G09G 2310/06–08
See application file for complete search history.

(56) References Cited

U.S. PATENT DOCUMENTS

2017/0148417 A1* 5/2017 Lee ..................... G06F 3/147
2021/0256891 A1* 8/2021 Honda ................. G09G 3/20

FOREIGN PATENT DOCUMENTS

| CN | 105049609 | A | 11/2015 |
| CN | 106020990 | A | 10/2016 |
| CN | 106816134 | A | 6/2017 |
| CN | 108345513 | A | 7/2018 |

* cited by examiner

FREQUENCY ADJUSTMENT METHOD AND APPARATUS APPLIED TO TERMINAL, AND ELECTRONIC DEVICE

CROSS-REFERENCE TO RELATED APPLICATIONS

This is a U.S. National Stage of International Patent Application No. PCT/CN2019/079953 filed on Mar. 27, 2019, which is hereby incorporated by reference in its entirety.

TECHNICAL FIELD

This application relates to the field of electronic technologies, and in particular, to a frequency adjustment method and apparatus applied to a terminal, and an electronic device.

BACKGROUND

A current electronic device (for example, a mobile phone or a tablet computer) has complex game content and a complex interface design, and develops in a heavy trend. For a current most popular real-time battle game, because a game scene changes quickly and irregularly, there is a high requirement on capabilities of a system on chip (system on chip, SOC) of the electronic device. Because the SOC is not fully provided in a timely manner in a specific scenario, a frame rate fluctuates greatly and frame freezing occurs frequently.

SUMMARY

Embodiments of this application provide a frequency adjustment method and apparatus applied to a terminal, and an electronic device, to reduce power consumption and improve stability of a frame rate.

According to a first aspect, an embodiment of this application provides a frequency adjustment method applied to a terminal, including: monitoring a drawing time of a first frame of image; obtaining a current state of a system on chip SOC when the drawing time exceeds first drawing duration, where the current state is any one or more of the following parameters: a current temperature of the SOC and current load of the SOC; determining whether the current state exceeds a first preset threshold; if the current state does not exceed the first preset threshold, increasing an operating frequency of the SOC in a time range, and restoring the operating frequency after the increasing of the operating frequency ends; obtaining actual drawing duration of the first frame of image when drawing of the first frame of image is completed: and monitoring a drawing time of a second frame of image when the actual drawing duration does not exceed second drawing duration, where the second drawing duration is determined based on a preconfigured maximum frame rate, and the first drawing duration is less than the second drawing duration. The operating frequency of the SOC is adjusted by dynamically monitoring drawing duration of each frame of image, the current load of the SOC, and the current temperature of the SOC in real time, to ensure that the SOC is fully provided in a timely manner. Therefore, a large fluctuation in a frame rate is reduced.

In a possible design, the time range is a preset time period, or the time range is duration from a start time point of increasing the operating frequency of the SOC to an end time point of drawing the first frame of image.

In another possible design, it is determined whether the current state exceeds a first preset threshold, and the method further includes: when the current state exceeds the first preset threshold, after the drawing of the first frame of image is completed, delaying preset duration to notify an application that the drawing of the first frame of image is completed. The operating frequency of the SOC is reduced by controlling drawing duration, to ensure a stable frame rate.

In another possible design, the method further includes: when the actual drawing duration exceeds the second drawing duration, obtaining a sum of first duration of the second frame of image to an $N^{th}$ frame of image, a sum of second duration of an $(N+1)^{th}$ frame of image to a $(2N-1)^{th}$ frame of image, and the current load of the SOC, where N is a positive integer greater than 2; and increasing the operating frequency of the SOC when a value obtained by subtracting the sum of the first duration from the sum of the second duration is greater than a second preset threshold, and the current load is greater than a third preset threshold to ensure stability of a frame rate when there is a burst high resource requirement.

In another possible design, the first drawing duration is 13 ms or 15 ms, and the first preset threshold is 70% or 80%.

In another possible design, an actual frame rate may be monitored, to determine whether actual drawing duration of each frame of image exceeds theoretical drawing duration. If the actual drawing duration of each frame of image exceeds the theoretical drawing duration, the current load of the SOC is obtained, and whether the current load of the SOC exceeds a preset threshold is determined. If the current load of the SOC exceeds the preset threshold, a single-frame pulse frequency modulation is performed. The operating frequency of the SOC is adjusted by dynamically monitoring the actual drawing duration and the current load, to ensure a stable frame rate.

In another possible design, an actual frame rate may be monitored, a sum of actual drawing duration of N frame of images may be obtained, and current load of the SOC when each of the N frame of images is drawn is determined. If the sum of the drawing duration of the N frame of images is greater than the first preset threshold, and the actual drawing duration of the N frame of images is in an increasing trend, it is determined whether the current load of the SOC is greater than a second preset threshold. If the current load of the SOC is greater than the second preset threshold, the operating frequency of the SOC. The operating frequency of the SOC is adjusted by dynamically monitoring the actual drawing duration and the current load, to ensure a stable frame rate.

In another possible design, an actual frame rate may be monitored to determine whether actual drawing duration of a plurality of frame of images is in a relatively stable state. If the actual drawing duration of the plurality of frame of images is not in the relatively stable state, the current temperature of the SOC is obtained, and whether the current temperature exceeds a preset threshold is determined. If the current temperature exceeds the preset threshold, the operating frequency or the current load of the SOC is reduced. The operating frequency of the SOC is adjusted by dynamically monitoring the actual drawing duration and the current temperature, to ensure a stable frame rate.

In another possible design, an actual frame rate may be monitored, to determine whether actual drawing duration of each frame of image exceeds theoretical drawing duration. The current temperature of the SOC and the current load of the SOC are determined, to determine, based on the current temperature and the current load, whether there is a possibility of increasing a frame rate. On the premise of ensuring a stable frame rate, the operating frequency of the SOC is increased, to increase timely provision of the SOC and increase the frame rate to a relatively high stable state.

In another possible design, the operating frequency of the SOC may be adjusted to a preset maximum frequency, to increase the operating frequency of the SOC.

In another possible design, the operating frequency of the SOC is increased based on a preset frequency modulation combination, where the frequency modulation combination includes a preset frequency corresponding to each SOC.

In another possible design, a middle value of actual drawing duration of K frame of images in the plurality of images is determined. Then, actual drawing duration of each frame of image is adjusted to the middle value. The operating frequency of the SOC is reduced by controlling the drawing duration of each frame of image.

In another possible design, the drawing duration of each frame of image may be increased based on a preset level duration, and the operating frequency of the SOC is reduced by controlling the drawing duration of each frame of image.

According to a second aspect, an embodiment of this application provides a frequency adjustment apparatus applied to a terminal. The frequency adjustment is configured to implement the method and the function performed by the electronic device in the first aspect. The frequency adjustment apparatus is implemented by using hardware/software, and the hardware/software of the frequency adjustment apparatus includes a module corresponding to the foregoing function.

According to a third aspect, an embodiment of this application provides an electronic device, including a processor, a memory, and a communications bus. The communications bus is configured to implement connection and communication between the processor and the memory, and the processor executes a program stored in the memory to implement steps in the frequency adjustment method applied to a terminal according to the first aspect.

In a possible design, the electronic device provided in this embodiment of this application may include a corresponding module configured to perform a behavior of the frequency adjustment apparatus applied to a terminal in the foregoing method design. The module may be software and/or hardware.

In another possible design, the processor and the memory may alternatively be integrated. The electronic device may be a chip.

According to a fourth aspect, an embodiment of this application provides a computer-readable storage medium. The computer-readable storage medium stores instructions, and when the instructions are run on a computer, the computer is enabled to perform the method in the foregoing aspects.

According to a fifth aspect, an embodiment of this application provides a computer program product including instructions. When the computer program product runs on a computer, the computer is enabled to perform the method in the foregoing aspects.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

Smooth running of a game requires timely and sufficient provision of an SOC of an electronic device. The SOC may include a central processing unit (central processing unit, CPU), a graphics processing unit (graphics processing unit, GPU), and a double data rate (double data rate, DDR) synchronous dynamic random access memory. In most scenarios, current SOC scheduling of an Android system uses a load-based scheduling algorithm. However, the scheduling algorithm has a long scheduling period and a conservative scheduling policy, and does not perform timely and sufficient scheduling based on characteristics of resource requirements in game scenarios. Therefore, when the scheduling algorithm is used, a fluctuation in a frame rate occurs. In some special scenarios (for example, severe overheating), a frequency of the SOC is limited, and the SOC cannot be fully provided in a timely manner. If a high frame rate is still required, the frame rate may fluctuate greatly.

In an existing technical solution, to ensure timely and sufficient provision of the SOC, after a game application is started, a game process is migrated to a CPU core, and operating frequencies of the CPU, the GPU, and the DDR are locked at relatively high frequencies. However, SOC requirements vary in each scenario. If the operating frequencies of the CPU, the GPU, and the DDR are locked at a relatively high frequency in all scenarios, power consumption is wasted, a mobile phone heats up, and the frame rate still fluctuates greatly. In addition, this simple guarantee mode cannot solve a problem of resource provision w % ben the game bursts with heavy load, and the frame rate still drops sharply. In addition, the operating frequencies of the CPU, the GPU, and the DDR are limited due to excessively high temperature.

To resolve the foregoing technical problems, the embodiments of this application provide the following solutions.

Figure 1:
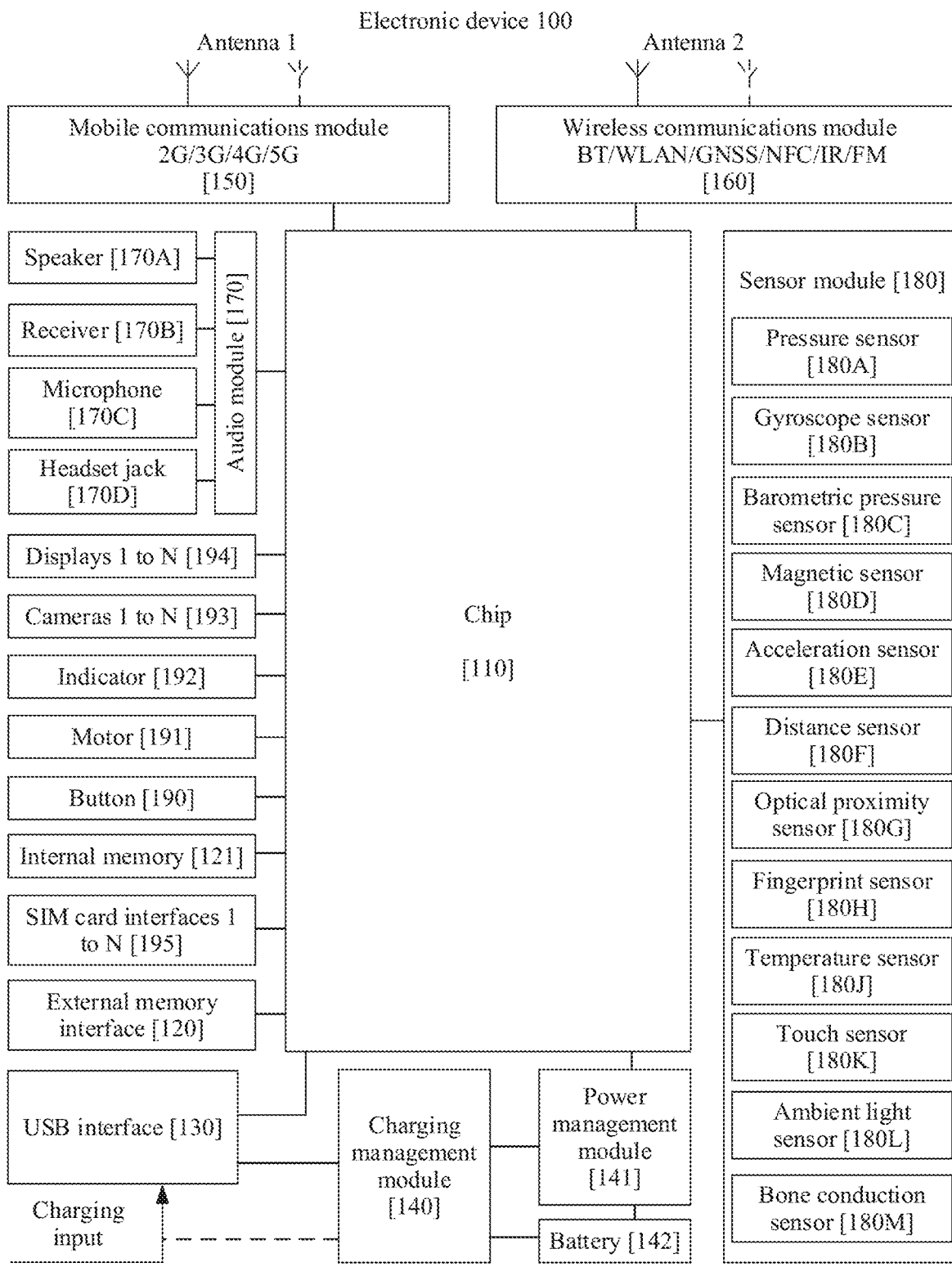
FIG. 1 is a schematic structural diagram of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180W, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a high-speed cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to; perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C port, or the like. The USB interface 130 may be configured to connect to a charger to charge the electronic device 100, and may also be configured to transmit data between the electronic device 100 and a peripheral device. The USB interface 130 may alternatively be configured to connect to a headset, to play audio through the headset. Alternatively, the port may be configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives input of the battery 142 and/or input of the charging management module 140, and supplies power to the processor 110, the internal memory 121, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and disposed in a same device with the mobile communications module 150 or another functional module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, such as image recognition, facial recognition, speech recognition, and text understanding, can be implemented by using the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, or may include a nonvolatile memory, for example, at least one magnetic disk storage component, a flash memory component, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function in addition to collecting a sound signal. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor.

The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is used in an application such as switching between a landscape mode and a portrait mode or a pedometer.

The range sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 1803. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer a detected touch operation to the application processor, to determine a type of a touch event. The display 194 may provide a visual output related to the touch operation. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
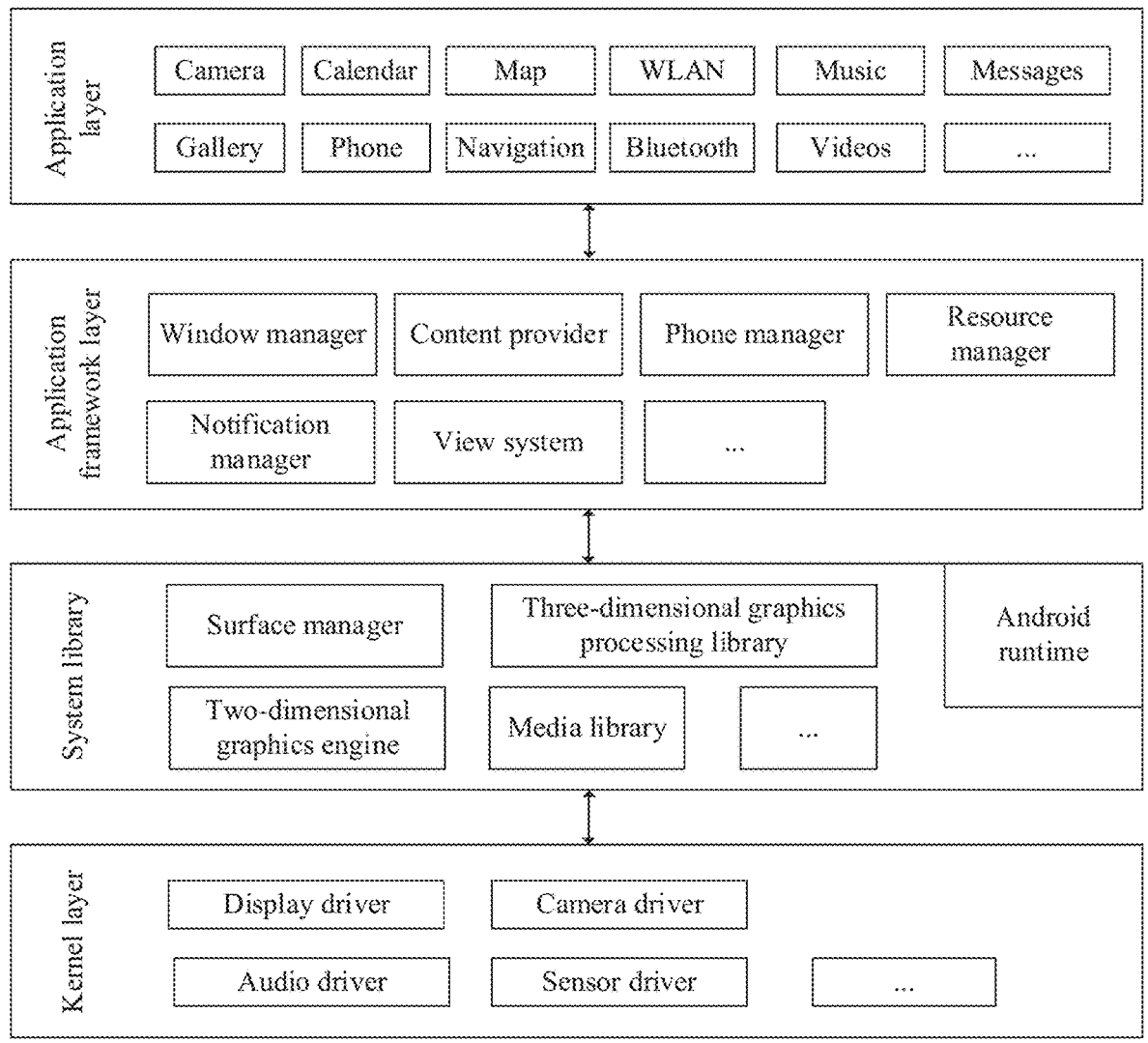
FIG. 2 is a block diagram of a software structure according to an embodiment of this application.

FIG. 2 is a block diagram of a software structure of an electronic device 100 according to an embodiment of this application.

In a hierarchical architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2, the application package may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

A content provider is configured to: store and obtain data, and enable the data to be accessed by an application. The data may include a video, an image, audio, calls that are made and received, a browsing history and a browsing bookmark, an address book, and the like.

The view system includes visual controls such as a control for displaying a text and a control for displaying a picture. The view system can be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in the status bar, and may be configured to convey a notification message. The notification manager may automatically disappear after a short pause without requiring user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, a prompt tone is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

A media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image drawing, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. The camera application invokes an interface at the application framework layer to enable the camera application, then enables a camera driver by invoking the kernel layer, and captures a static image or a video through the camera 193.

The following describes in detail the frequency adjustment method in the embodiments of this application with reference to the structure of the electronic device shown in FIG. 1 and the software structural block diagram shown in FIG. 2. In some embodiments, when detecting that a game is started, the electronic device enables a dynamic frequency adjustment function to adjust an operating frequency of an SOC. In some other embodiments, after detecting that a game is started, the electronic device pops up a prompt box to prompt a user whether to use a dynamic frequency adjustment function. A manner of enabling the dynamic frequency adjustment function is not limited in the embodiments of this application.

The following uses specific embodiments for description.

Figure 3:
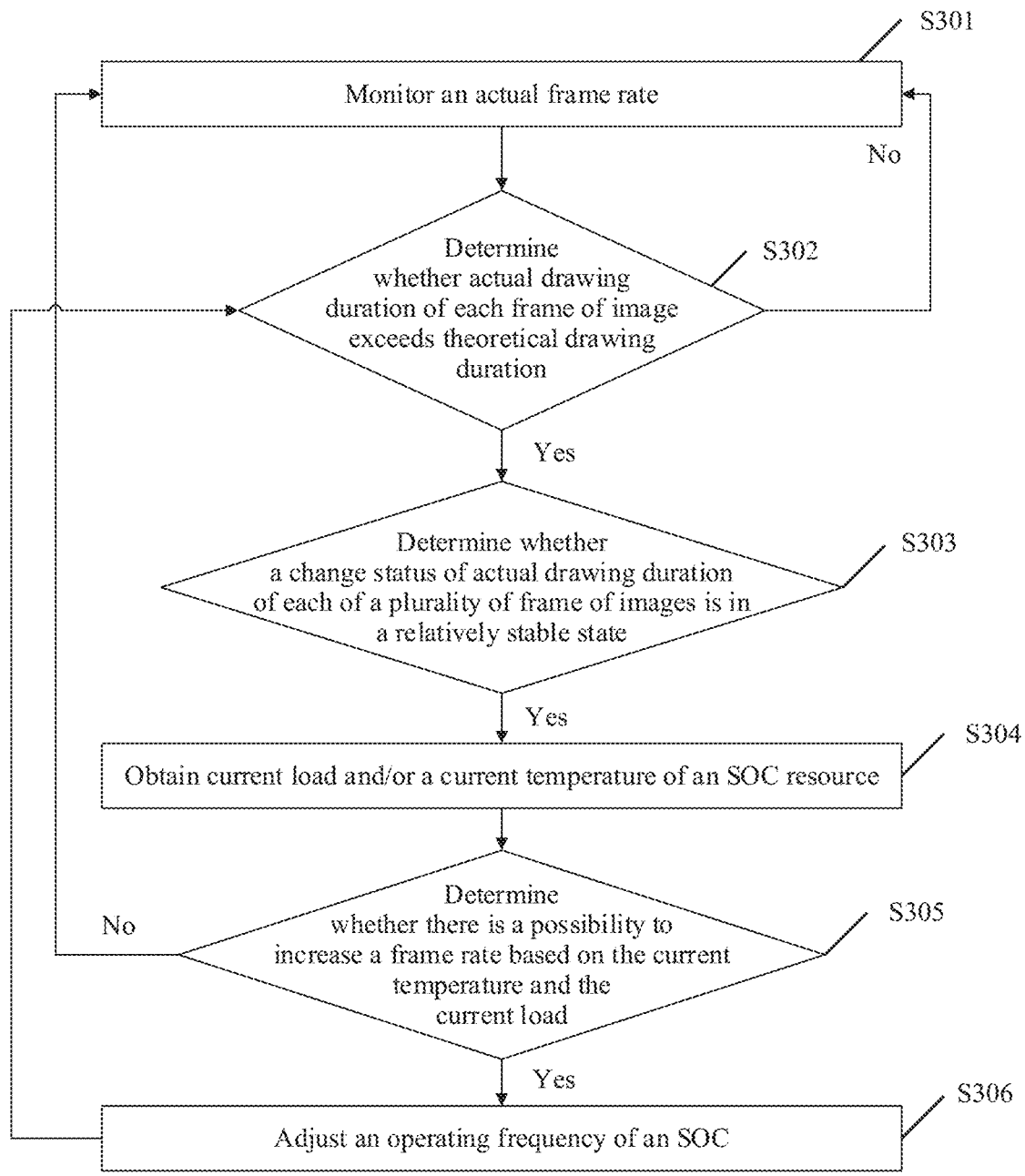
FIG. 3 is a schematic flowchart of a frequency adjustment method applied to a terminal according to an embodiment of this application.

FIG. 3 is a schematic flowchart of a frequency adjustment method applied to a terminal according to an embodiment of this application. As shown in the figure, steps in this embodiment of this application include at least the following:

S301: Monitor an actual frame rate.

After a dynamic frequency adjustment function is enabled, an electronic device starts to monitor an actual frame rate of an electronic game picture. In some embodiments, the electronic device starts to obtain an actual frame rate of a game scenario, and obtains actual drawing duration of each frame of image by using the actual frame rate. A frame rate may represent a quantity of frames for drawing an image per second. For example, assuming that a current actual frame rate is 80 fps (a quantity of transmitted frames per second), current actual drawing duration of each frame of image is 1000 ms/80=12.5 ms.

S302: Determine whether the actual drawing duration of each frame of image exceeds theoretical drawing duration.

If the actual drawing duration of each frame of image does not exceed the theoretical drawing duration, step S301 is performed to continue monitoring the actual frame rate. If the actual drawing duration of each frame of image exceeds the theoretical drawing duration, step S303 is performed.

The theoretical drawing duration may be calculated based on a target frame rate, and the target frame rate may be a maximum frame rate designed for a game. For example, for a game with a maximum frame rate of 60 fps, theoretical drawing duration of each frame of image is 1000 ms/60=16.6 ms.

S303: Collect statistics on drawing duration of a plurality of frame of images based on a preset period, and determine whether a frame rate change status of each of the plurality of frame of images is in a relatively stable state.

In specific implementation, actual drawing duration of N frames may be cyclically obtained (obtain drawing duration of N frame of images in a first period, obtain drawing duration of another N frame of images in a second period, and the like), where N may be 3, 4, 5, or the like. Then, drawing duration of a plurality of N frame of images is separately compared to determine whether the drawing duration of the plurality of N frame of images are the same or approximately the same. If the drawing duration of the plurality of N frame of images is the same or approximately the same, it indicates that the frame rate change status of each of the plurality of frame of images is in a relatively stable state, that is, a frame rate does not fluctuate greatly, and step S304 is performed. If a difference between the drawing duration of the plurality of N frame of images is large or continuously increases, it indicates that the frame rate change status of each of the plurality of frame of images is in an unstable state, that is, a frame rate fluctuates greatly. In this case, single-frame pulse frequency modulation or frame rate control may be performed. For a specific method, refer to detailed descriptions in the following embodiment.

Figure 4A:
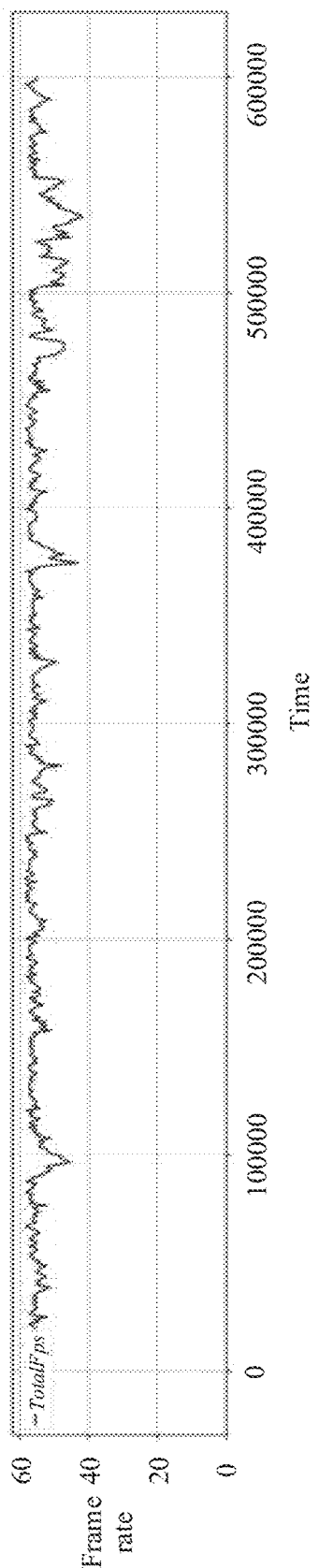
FIG. 4(A) is a schematic diagram of a fluctuation in a frame rate according to an embodiment of this application.
Figure 4B:
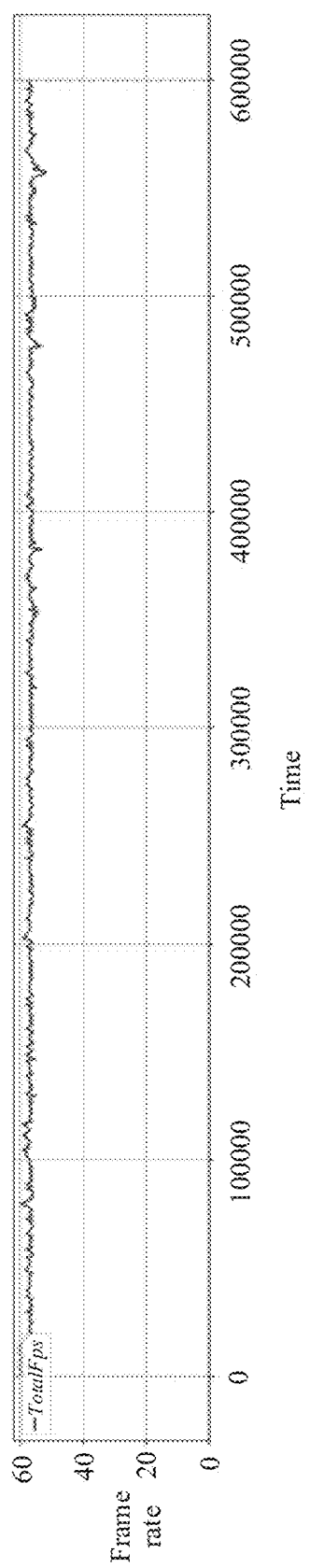
FIG. 4(B) is a schematic diagram of stability of a frame rate according to an embodiment of this application.

For example, statistics may be collected every three frames, and statistics on drawing duration of a plurality of three frame of images are collected. An average value of drawing duration of each three frame of images is calculated, and a frame rate of each three frame of images is calculated based on the average value of the drawing duration of each three frame of images. A larger average value indicates a smaller frame rate, and a smaller average value indicates a larger frame rate. Average values of the plurality of three frame of images are then compared to determine whether the frame rate fluctuates greatly. FIG. 4(A) is a schematic diagram of a fluctuation in a frame rate according to an embodiment of this application. With drawing time elapses, the frame rate fluctuates greatly at some time points, and is in an unstable state. FIG. 4(B) is a schematic diagram of stability of a frame rate according to an embodiment of this application. With drawing time elapses, a frame rate fluctuates slightly, and is in a relatively stable state.

It should be noted that after S301 is performed, S303 may be directly performed to determine the frame rate change status of each of the plurality of frame of images by collecting statistics on the actual drawing duration of the plurality of frame of images.

S304: Obtain a current temperature of an SOC or current load of an SOC, or obtain a current temperature of an SOC and current load of the SOC.

In specific implementation, an average temperature during SOC running in a period of time may be used as a current temperature of a GPU. A quantity of tasks processed by a current SOC may be obtained, and the current load of the SOC is calculated by dividing the quantity of tasks by a maximum quantity of tasks that can be processed by the SOC.

S305: Determine, based on the current temperature and the current load, whether there is a possibility of increasing the frame rate.

In specific implementation, if the current temperature exceeds a first preset threshold or the current load of the SOC exceeds a second preset threshold, it is determined that there is no possibility of increasing the frame rate, and S301 is performed to continue monitoring the frame rate. If the current temperature does not exceed the first preset threshold or the current load of the SOC does not exceed the second preset threshold, it is determined that there is a possibility of increasing the frame rate. Alternatively, if the current temperature does not exceed the first preset threshold and the current load of the SOC does not exceed the second preset threshold, it is determined that there is a possibility of increasing the frame rate. If there is a possibility of increasing the frame rate, S306 is performed. The first preset threshold may be a maximum temperature of the SOC when the frame rate is kept stable. For example, the first preset threshold may be 40 degrees Celsius or 39 degrees Celsius. The second preset threshold is a maximum load quantity of the SOC. For example, the second preset threshold may be 70% or 80%.

S306: Increase an operating frequency of the SOC while ensuring that the frame rate is stable, to increase timely provision of the SOC.

In specific implementation, the operating frequency of the SOC may be locked in a relatively high stable state (for example, a theoretical maximum frequency), and the operating frequency before adjustment is restored after a period of time. The period of time may be 4 ms, or may be the theoretical drawing duration. For example, for a game with a maximum frame rate of 60 fps, the theoretical drawing duration may be 16.6 ms. After the operating frequency is adjusted, S302 is performed to determine whether actual drawing duration of a next frame of image exceeds the theoretical drawing duration.

In this embodiment of this application, when the frame rate is stable, it may be determined, based on the current temperature or the current load, whether there is a possibility of increasing the frame rate. If there is a possibility of increasing the frame rate, the operating frequency of the SOC is increased while it is ensured that the frame rate is stable. In this way, timely provision of the SOC is increased, and the frame rate is increased to a relatively high stable state.

Figure 5:
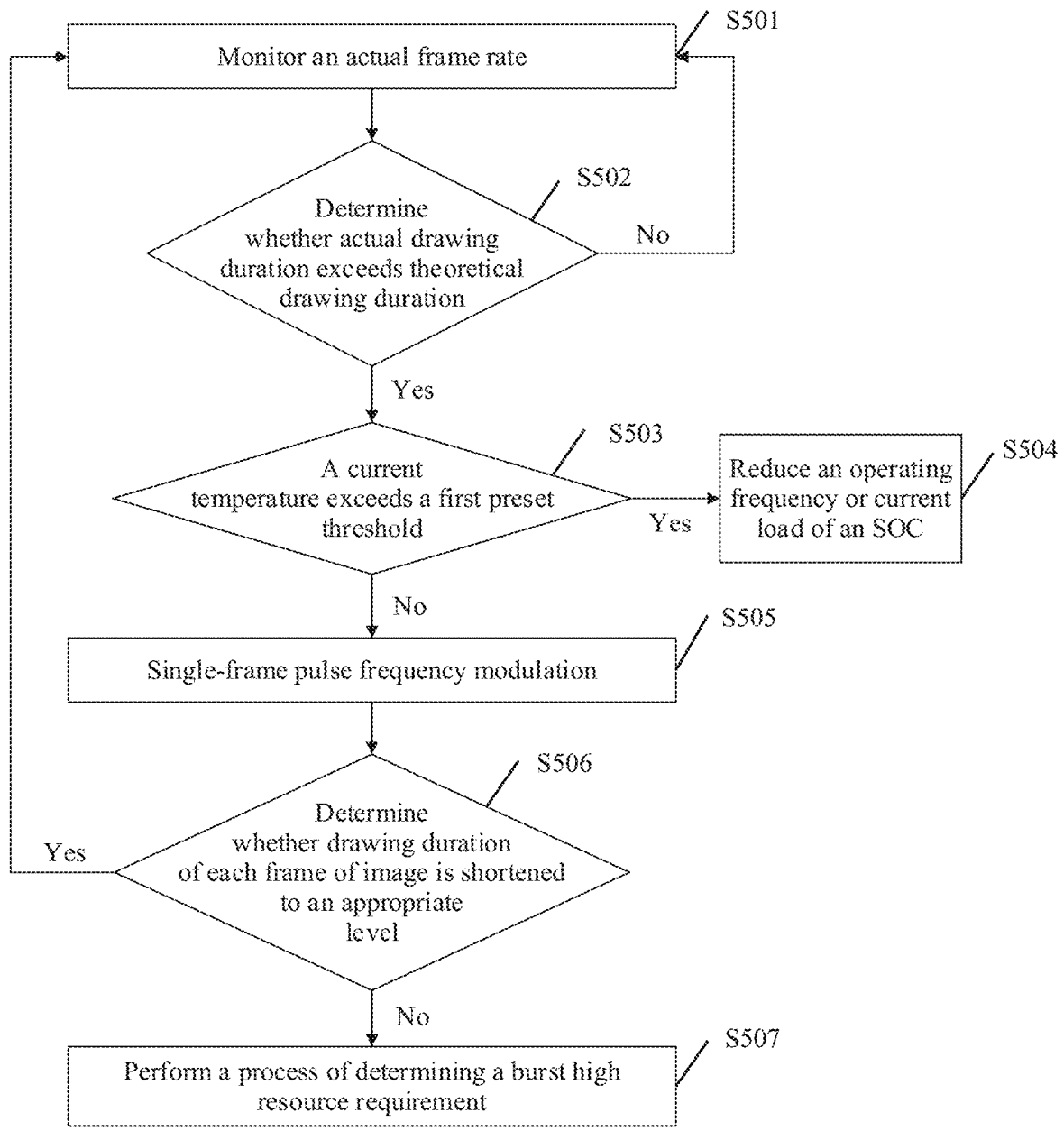
FIG. 5 is a schematic flowchart of another frequency adjustment method applied to a terminal according to an embodiment of this application.

FIG. 5 is a schematic flowchart of another frequency adjustment method applied to a terminal according to an embodiment of this application. As shown in the figure, steps in this embodiment of this application include at least the following;

S501: Monitor an actual frame rate.

In specific implementation, a current actual frame rate may be monitored, and actual drawing duration of each of M frame of images is calculated based on the actual frame rate, where M is an integer greater than or equal to 1. A frame rate may represent a quantity of frames that an image is drawn per second. For example, assuming that the current actual frame rate is 80 fps (quantity of transmitted frames per second), actual drawing duration of each frame of image is 1000 ms/80=12.5 ms.

S502: Determine whether actual drawing duration of each frame of image exceeds theoretical drawing duration. If the actual drawing duration of each frame of image does not exceed the theoretical drawing duration, perform S501 to continue monitoring the actual frame rate. If the actual drawing duration of each frame of image exceeds the theoretical drawing duration, perform S503.

The theoretical drawing duration may be calculated based on a target frame rate, and the target frame rate may be a maximum frame rate designed for a game. For example, for a 60 fps game, theoretical drawing duration of each frame of image is 1000 ms/60=16.6 ms.

S503: Determine whether a current temperature of an SOC exceeds a first preset threshold. If the current temperature exceeds the first preset threshold, S504 is performed; or if the current temperature does not exceed the first preset threshold, S505 is performed. The first preset threshold may be a maximum temperature of the SOC when a frame rate is kept stable. For example, the first preset threshold may be 40 degrees Celsius or 39 degrees Celsius.

It should be understood that when SOC provision is relatively high or the temperature is relatively high, if an image is still drawn by using a relatively high frame rate, the temperature continuously increases, and an operating frequency of the SOC is limited. Consequently, the frame rate fluctuates greatly. For example, a maximum dominant frequency of a CPU is 2.6 GHz, and a current dominant frequency of the CPU has reached 2.6 GHz. In this case, there is no space for providing resources. Alternatively, if the current temperature exceeds 39 degrees Celsius, if the dominant frequency of the CPU continues to be increased, CPU power consumption increases, the temperature increases rapidly, and the frame rate fluctuates greatly.

S504: Reduce the operating frequency or current load of the SOC.

In specific implementation, the operating frequency of the SOC may be reduced by controlling the actual drawing duration of each frame of image. Further, a middle value of actual drawing duration of K frame of images in the plurality of frame of images may be determined. Then, actual drawing duration of each frame of image is adjusted to the middle value. Alternatively, the actual drawing duration of each frame of image may be increased based on preset level duration, where K may be 3, 4, 5, or the like.

For example, when the temperature of the SOC is relatively high, statistics may be collected on actual drawing duration of three frame of images, a middle value of the actual drawing duration of the three frame of images may be calculated, and then frame rate control is performed in a subsequent process of interaction between a game application and a system interface. If actual drawing duration of a frame of image is less than the middle value, the actual drawing duration of the frame of image is adjusted to the middle value, to reduce the frame rate. If actual drawing duration of a frame of image is not less than the middle value, the actual drawing duration may be maintained because the current temperature or the current load is relatively high, and the actual drawing duration of the frame of image is not adjusted. After the foregoing adjustment, statistics are collected on the actual drawing duration of the three frame of images again. If the frame rate is still unstable, the actual drawing duration of each frame of image is increased based on level duration of 1 ms, the frame rate is continuously decreased, and the temperature is controlled to increase until the frame rate becomes stable. The frame rate may be set to a minimum value. For example, when a frame rate of a game with 60 frames per second is controlled, a minimum value of the frame rate can be set to 45 frames per second, and an adjusted frame rate cannot be lower than 45 frames per second.

For another example, the frame rate may be controlled in the following manner: When drawing each frame of image, the game application needs to invoke the system interface. After drawing the image, the system interface notifies the game application. After receiving the notification, the game application draws a next frame of image. Therefore, code may be inserted into the system interface, and after drawing an image, the system interface delays to notify the game application. For example, after drawing of a frame of image is completed, the system interface notifies the game application after 1 ms delay, which is equivalent to increasing drawing duration of each frame of image based on level duration of 1 ms. In this way, actual drawing duration of each frame of image is adjusted to 16.6 ms+1 ms.

Figure 6A:
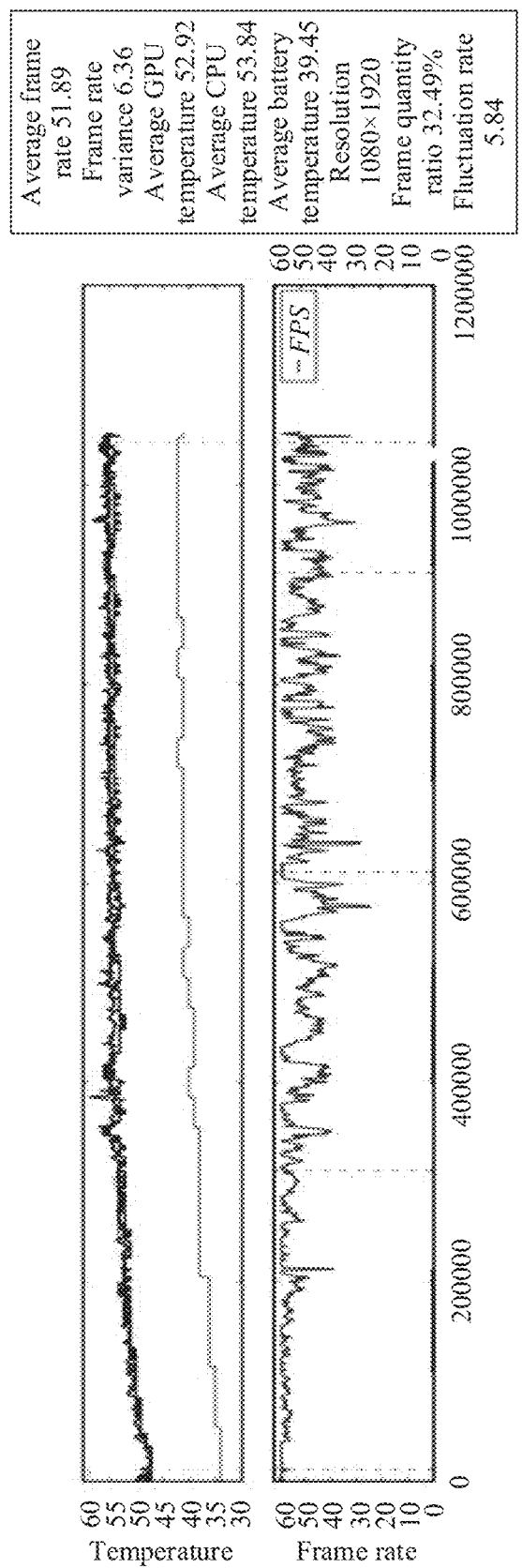
FIG. 6(A) is a schematic diagram of a relationship between a temperature and a frame rate according to an embodiment of this application.
Figure 6B:
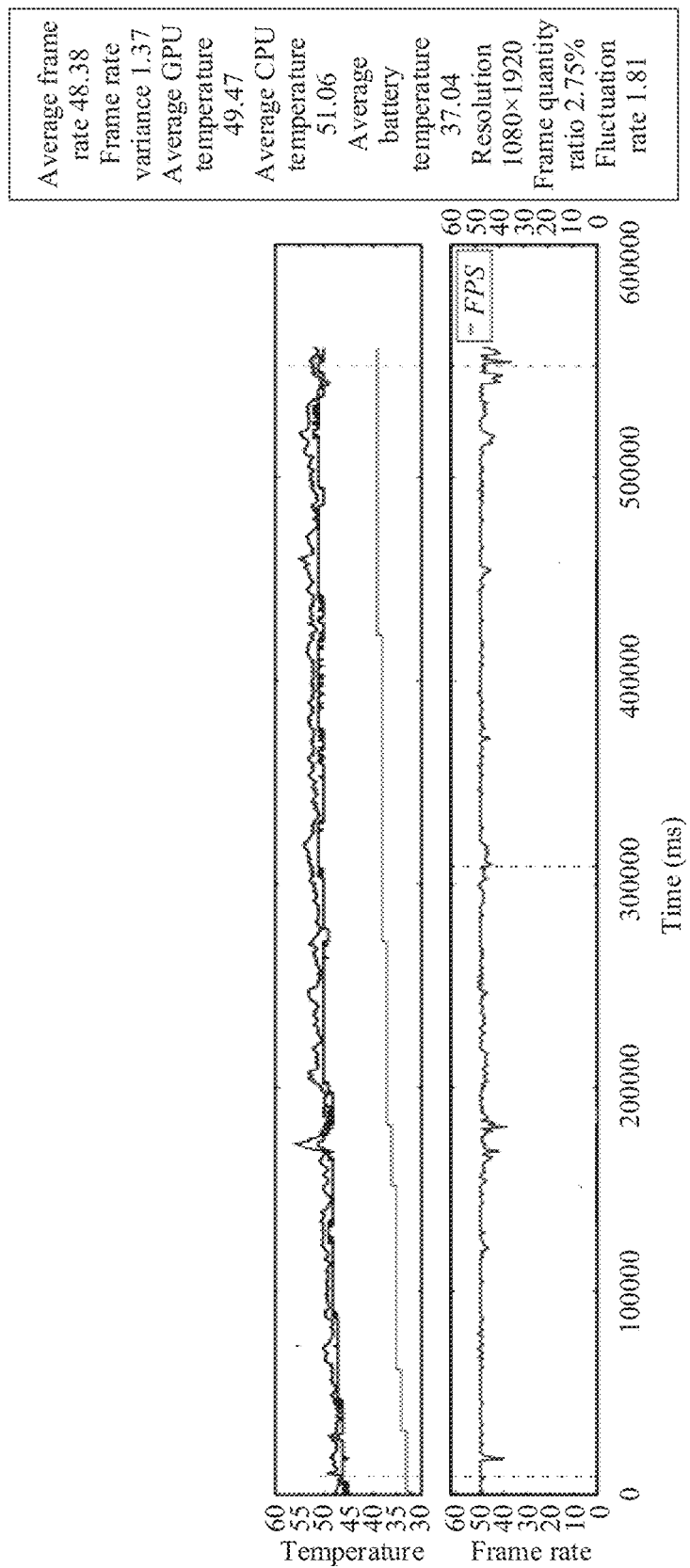
FIG. 6(B) is a schematic diagram of another relationship between a temperature and a frame rate according to an embodiment of this application.

As shown in FIG. 6(A), an upper curve is a temperature change curve, and a lower curve is a frame rate change curve. As a temperature increases, a frame rate starts to fluctuate greatly. When the frame rate shown in FIG. 6(A) fluctuates, an average frame rate is 51.89, a frame rate variance is 6.36, an average temperature of a GPU is 52.92, an average temperature of a CPU is 53.84, an average temperature of a battery is 39.45, a frame quantity ratio is 32.49%, and a fluctuation rate is 5.84. The frame rate variance may represent a variance between actual drawing duration of each frame of image, the frame quantity ratio may represent a ratio of a frame quantity whose frame rate is less than 45 in each second to a total frame quantity drawn per second, and the fluctuation rate may be determined based on a fluctuation status of the frame rate. As shown in FIG. 6(B), an upper curve is a temperature change curve, and a lower curve is a frame rate change curve. When a frame rate shown in FIG. 6(B) is stable, the average frame rate is 48.38, the frame rate variance is 1.37, the average temperature of the GPU is 49.47, the average temperature of the CPU is 51.06, the average temperature of the battery is 37.04, the frame quantity ratio is 2.75%, and the fluctuation rate is 1.81. It can be learned that when the average frame rate is reduced from 51.89 fps to 48.38 fps, the temperatures of the GPU, the CPU, and the battery are all decrease, and the frame rate variance, the frame quantity ratio, and the fluctuation rate also decrease. In this case, the frame rate is in a relatively stable state.

S505: Increase the operating frequency of the SOC.

In specific implementation, the operating frequency of the SOC may be adjusted to a preset maximum frequency through single-frame pulse frequency modulation. For example, the operating frequency of the SOC may be locked to a theoretical maximum frequency, and the operating frequency before adjustment is restored after a period of time. The period of time may be 4 ms, or may be the theoretical drawing duration. For example, for a game with a maximum frame rate of 60 fps, the theoretical drawing duration may be 16.6 ns.

In an optional manner, in a drawing process of each frame of image, it may be determined whether actual drawing duration of each frame of image exceeds the theoretical drawing duration. If the actual drawing duration of each frame of image exceeds the theoretical drawing duration, the single-frame pulse frequency modulation is started, and the single-frame pulse frequency modulation is ended when drawing of a single-frame of image is completed. Then, a next frame of image is drawn.

For example, it is assumed that the theoretical drawing duration (which may also be referred to as a screen refresh period) of each frame of image is 16.6 ms, and if the actual drawing duration of each frame of image exceeds 16.6 ms, an image drawing speed cannot keep up with a screen refresh speed. As a result, the drawing of the image cannot be completed and provided to the screen for display. Consequently, a frame loss occurs. In this process, to avoid frame loss, current load of a CPU and a DDR may be obtained before the drawing of each frame of image is completed within 15 ms. If the current load of the CPU or the DDR is greater than 80%, the single-frame pulse frequency modulation may be performed.

Figure 7:
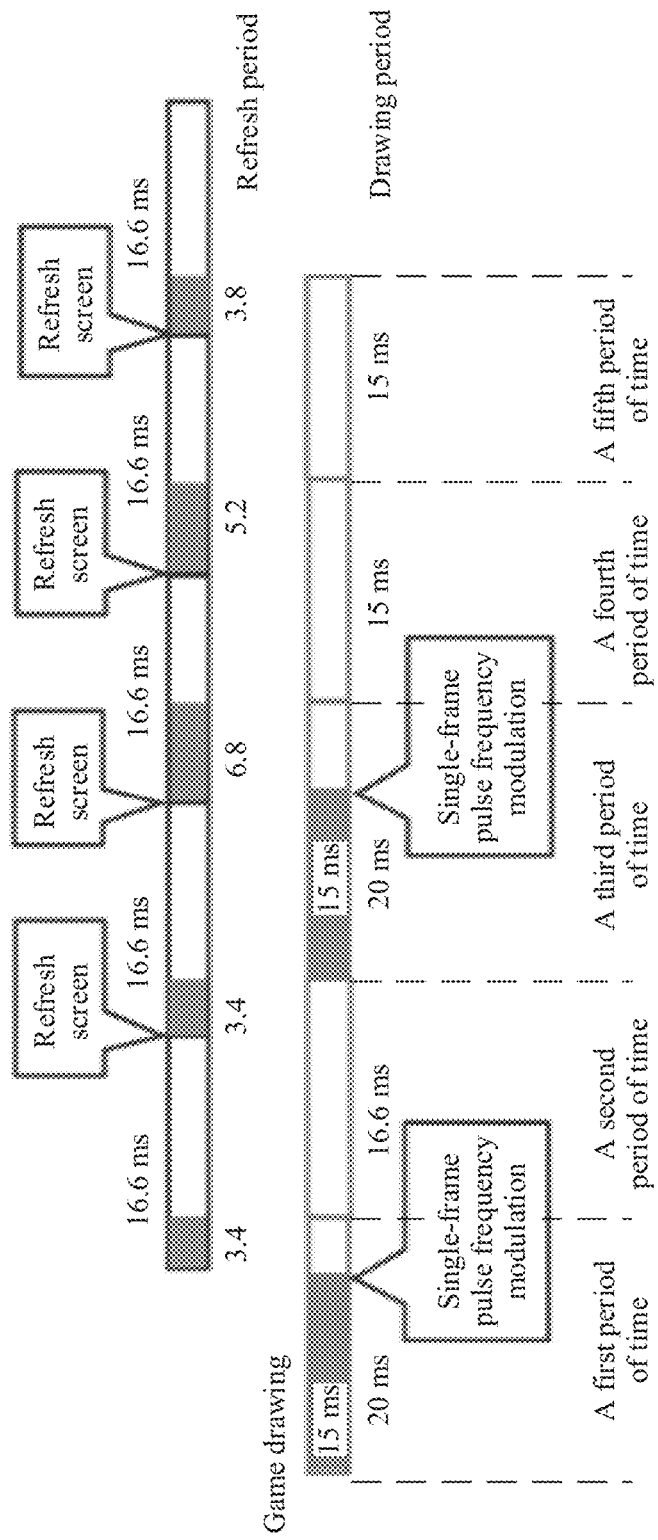
FIG. 7 is a schematic diagram of single-frame pulse frequency modulation according to an embodiment of this application.

FIG. 7 is a schematic diagram of single-frame pulse frequency modulation according to an embodiment of this application. A first line is a time progress bar of screen refresh. It is assumed that theoretical drawing duration of each frame of image is 16.6 ms, and an electronic device performs screen refresh at a period of 16.6 ms. A second line is a time progress bar of image drawing. It can be learned from a first time period of the second line that actual drawing duration required to complete drawing of a single-frame of image is 20 ms, which has exceeded the screen refresh period 16.6 ms. Therefore, when the drawing of the single-frame of image reaches 15 ms, it is determined whether the drawing of the single-frame of image is complete. If the drawing of the single-frame of image is not complete, single-frame pulse frequency modulation is performed when the drawing of the single-frame of image reaches 15 ms (optimal drawing duration), to increase the frame rate and shorten the drawing duration of the single-frame of image. It can be learned from a second time period of the second line that actual drawing duration required to complete drawing of a single-frame of image is 16.6 ms. The actual drawing duration is equal to the screen refresh period, and single-frame pulse frequency modulation may not be performed. It can be learned from a third time period of the second line that actual drawing duration required to complete drawing of a single-frame of image is 20 ms, which has exceeded the screen refresh period 16.6 ms. Therefore, when the drawing of the single-frame of image reaches 15 ms, it is determined whether the drawing of the single-frame of image is complete. If the drawing of the single-frame of image is not complete, single-frame pulse frequency modulation is performed when the drawing of the single-frame of image reaches 15 ms (optimal drawing duration), to increase the frame rate and shorten the drawing duration of the single-frame of image. It can be learned from a fourth time period and a fifth time period of the second line, actual drawing duration required to complete drawing of a single-frame of image is 15 ms, which is less than the screen refresh period 16.6 ms. Therefore, single-frame pulse frequency modulation is not required. For subsequent frame of images, if actual drawing duration exceeds theoretical drawing duration, single-frame pulse frequency modulation may be performed according to the foregoing method.

In another optional manner, the electronic device continuously draws a plurality of frame of images (a first frame, a second frame, a third frame, a fourth frame, and the like). If it is determined that actual drawing duration of the first frame of image exceeds theoretical drawing duration, single-frame pulse frequency modulation is started when the second frame of image is drawn to the theoretical drawing duration, and the single-frame pulse frequency modulation is ended when the drawing of the second frame of image is completed. Then, it is determined whether actual drawing duration of the third frame of image exceeds the theoretical drawing duration, and if the actual drawing duration of the third frame of image exceeds the theoretical drawing duration, the single-frame pulse frequency modulation is started when a fourth frame of image is drawn to the theoretical drawing duration, and the single-frame pulse frequency modulation is ended when the drawing of the fourth frame of image is completed. The rest may be deduced by analogy.

S506: Determine whether the actual drawing duration of each frame of image is shortened to an appropriate level. If the actual drawing duration of each frame of image is shortened to the appropriate level, it indicates that the actual drawing duration of each frame of image does not exceed the theoretical drawing duration, and perform S501 to continue monitoring the actual frame rate. If the actual drawing duration of each frame of image is not shortened to the appropriate level, perform S507.

In specific implementation, after the operating frequency of the SOC is increased, it may be determined whether the actual drawing duration of each frame of image falls within an appropriate interval. For example, assuming that the theoretical drawing duration is 16.6 ms, before the operating frequency of the SOC is increased, the actual drawing duration of each frame of image is 20 ms, and after the operating frequency of the SOC is increased, the actual drawing duration of each frame of image is shortened to 15 ms. Because the actual drawing duration 15 ms is within the appropriate interval and is the optimal drawing duration, it may be determined that the actual drawing duration of each frame of image has been shortened to the appropriate interval.

S507: Perform a process of determining a burst high resource requirement. For a specific manner, refer to the following embodiments.

In this embodiment of this application, when the frame rate fluctuates greatly, the operating frequency of the SOC is adjusted based on the current temperature and actual drawing duration, to control stability of the frame rate.

Figure 8:
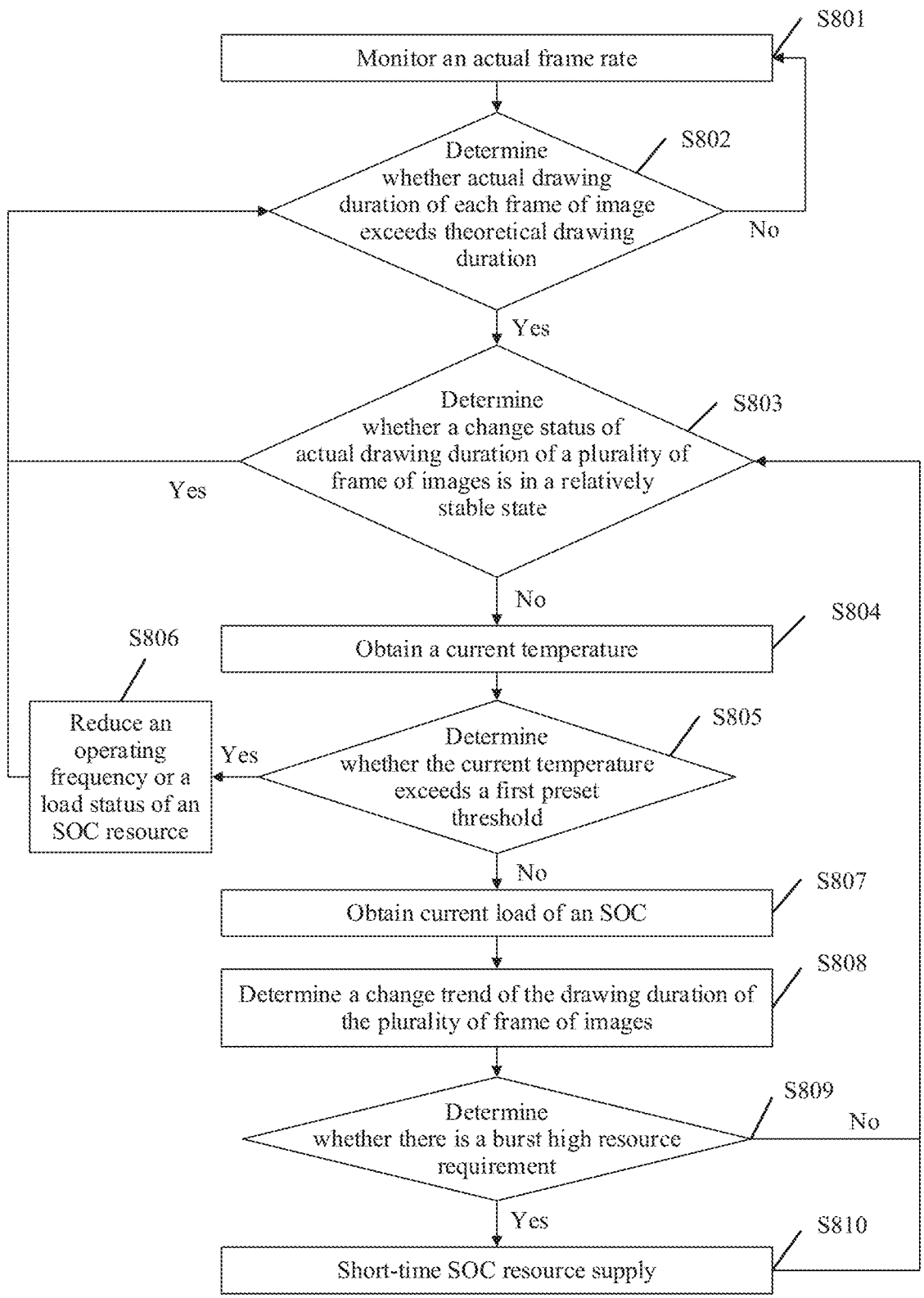
FIG. 8 is a schematic flowchart of still another frequency adjustment method applied to a terminal according to an embodiment of this application.

FIG. 8 is a schematic flowchart of still another frequency adjustment method applied to a terminal according to an embodiment of this application. As shown in the figure, steps in this embodiment of this application include at least the following;

S801: Monitor an actual frame rate. For a specific implementation, refer to S301. Details are not described in this step.

S802: Determine whether actual drawing duration of each frame of image exceeds theoretical drawing duration. If the actual drawing duration of each frame of image does not exceed the theoretical drawing duration, perform S801 to continue monitoring the actual frame rate. If the actual drawing duration of each frame of image exceeds the theoretical drawing duration, perform S803.

S803: Collect statistics on actual drawing duration of a plurality of frame of images based on a preset period, and determine whether a frame rate change status of each of the plurality of frame of images is in a relatively stable state. If the frame rate change status of each of the plurality of frame of images is in the relatively stable state, perform S802 to perform step S802. If the frame rate change status of each of the plurality of frame of images is not in the relatively stable state, perform S804.

For a specific implementation, refer to S303. Details are not described in this step.

S804: Obtain a current temperature of an SOC.

S805: Determine whether the current temperature exceeds a first preset threshold. If the current temperature exceeds the first preset threshold, S806 is performed. If the current temperature does not exceed the first preset threshold, S807 is performed. The first preset threshold may be a maximum temperature of the SOC when a frame rate is kept stable. For example, the first preset threshold may be 40 degrees Celsius or 39 degrees Celsius.

S806: Reduce an operating frequency or current load of the SOC. For a specific implementation, refer to S504. Details are not described in this step. If the execution is completed, perform S802 to continue performing step S802.

S807: Obtain the current load of the SOC.

In specific implementation, a quantity of tasks processed by the current SOC may be obtained, and then the quantity of tasks is divided by a maximum quantity of tasks that can be processed by the SOC, to obtain the current load of the SOC through calculation.

S808: Determine a change trend of the actual drawing duration of the plurality of frame of images.

In specific implementation, statistics may be collected on a sum of actual drawing duration of every N frame of images in the plurality of frame of images, where N is an integer greater than or equal to 1. Then, an increase amount of the sum of the drawing duration is determined based on the sum of the drawing duration of the plurality of N frame of images. Finally, the change trend of the actual drawing duration of the plurality of frame of images is determined based on the increase amount of the sum of the drawing duration. For example, statistics may be collected every five frame of images, and statistics are collected on actual drawing duration of the five frame of images each time, to determine a change status of actual drawing duration of each of a plurality of five frame of images.

S809: Determine, based on the current load of the SOC and the change trend of the actual drawing duration of the plurality of N frame of images, whether there is a burst high resource requirement. If there is the burst high resource requirement, perform S810. If there is no burst high resource requirement, perform S803.

In specific implementation, it may be determined whether the current load of the SOC exceeds a second preset threshold, whether a difference between the actual drawing duration of each N frame of images minus the theoretical drawing duration is greater than a third preset threshold, and whether an increase amount between the actual drawing duration of the plurality of N frame of images is greater than a fourth preset threshold, and determine whether there is a burst high resource requirement. The second preset threshold may be a maximum load quantity of the SOC, for example, the second preset threshold is 70% or 80%. The third preset threshold may be the theoretical drawing duration 16.6 ms, the fourth preset threshold may be the theoretical drawing duration 16.6 ms, and the like. The foregoing parameters can be set based on specific scenario requirements. If the current load of the SOC exceeds the second preset threshold, the difference between the actual drawing duration of each N frame of images minus the theoretical drawing duration is greater than the third preset threshold, and the increase amount between the actual drawing duration of the plurality of N frame of images is greater than the fourth preset threshold, it is determined that there is the burst high resource requirement.

For example, it is assumed that the theoretical drawing duration of each frame of image is 16.6 ms. Actual drawing duration of five frame of images is monitored in real time, and the actual drawing duration of the five frame of images is compared with theoretical drawing duration of the five frame of images. If a difference between the actual total drawing duration of the five frame of images minus the theoretical drawing duration of the five frame of images is greater than 16.6 ms, it can be determined that there is the high resource requirement. In addition, the actual drawing duration of the monitored five frame of images may be compared with actual drawing duration of previously monitored five frame of images. If the actual drawing duration of the five frame of images is longer than the actual drawing duration of the previously monitored five frame of images, and an increase value between the actual drawing duration of the five frame of images and the actual drawing duration of the previously monitored five frame of images is greater than 16.6 ns and the current load of the SOC is greater than 80%, it is determined that there is the burst high resource requirement.

S810: Increase the operating frequency of the SOC to provide short-time high resource provision. After the execution is completed, perform S803 to perform step S803.

In specific implementation, the SOC may include a CPU, a DDR, and a GPU, and each frequency modulation combination includes a frequency corresponding to the CPU, a frequency corresponding to the DDR, and a frequency corresponding to the GPU. A plurality of frequency modulation combinations may be preset based on different levels, and the plurality of frequency modulation combinations are sorted based on an energy efficiency ratio of each frequency modulation combination, where the energy efficiency ratio increases sequentially as a level improves. When the operating frequency of the SOC needs to be increased, the frequency modulation combination may be increased by one level, and then the actual drawing duration of the five frame of images is monitored, to determine whether the actual drawing duration of the five frame of images is reduced to the theoretical drawing duration of the five frame of images. If the actual drawing duration of the five frame of images is reduced to the theoretical drawing duration of the five frame of images, the operating frequency of the SOC may be increased for two consecutive frequency modulation periods. If the actual drawing duration of the five frame of images is still greater than the theoretical drawing duration of the five frame of images after the frequency modulation combination is increased by one level, the frequency modulation combination may be increased by on level again. The rest may be deduced by analogy. The frequency modulation period in this embodiment of this application may be theoretical drawing duration (for example, 16.6 ms), or may be a preset time period (for example, 4 ms). This is not limited in this embodiment of this application.

In this embodiment of this application, when a frame rate fluctuates greatly, it is determined, based on the actual drawing duration, and the current load and the current temperature of the SOC, whether there is the burst high resource requirement. The operating frequency of the SOC is adjusted when it is determined that there is the burst high resource requirement, to ensure timely and sufficient SOC provision, so as to reduce power consumption and a fluctuation in a frame rate.

Figure 9:
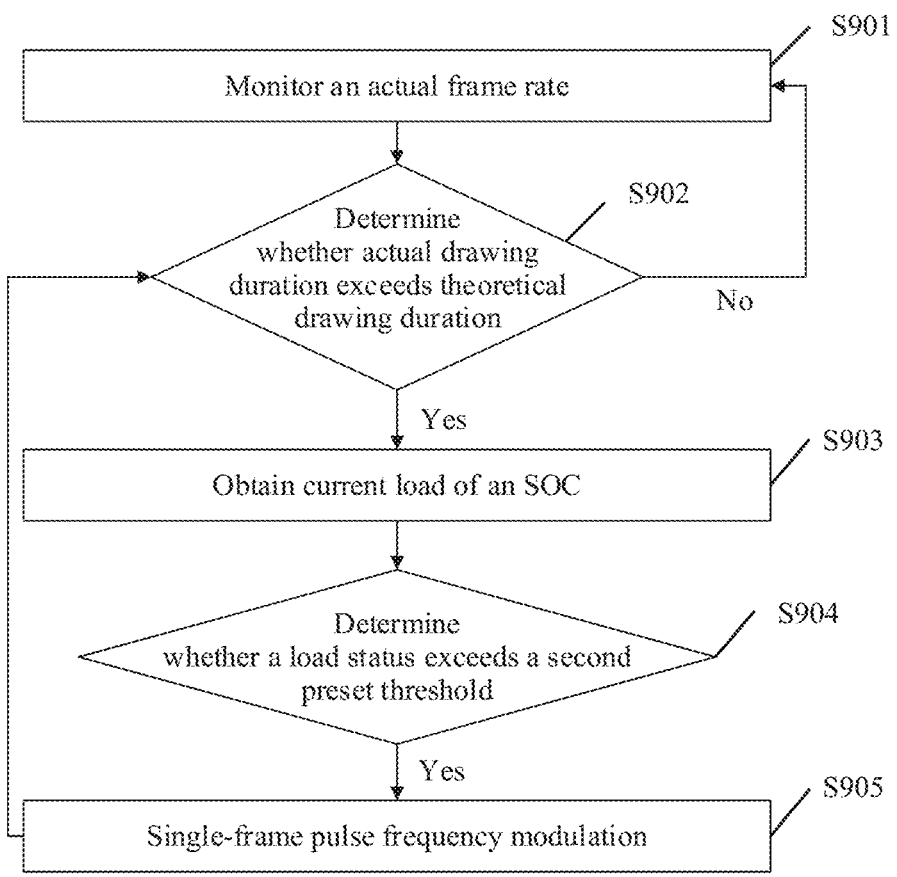
FIG. 9 is a schematic flowchart of still another frequency adjustment method applied to a terminal according to an embodiment of this application.

FIG. 9 is a schematic flowchart of still another frequency adjustment method applied to a terminal according to an embodiment of this application. As shown in the figure, steps in this embodiment of this application include at least the following:

S901: Monitor an actual frame rate. For a specific implementation, refer to the foregoing embodiments. Details are not described in this step.

S902: Determine whether actual drawing duration of each frame of image exceeds theoretical drawing duration. If the actual drawing duration of each frame of image does not exceed the theoretical drawing duration, perform S901 to continue monitoring the actual frame rate. If the actual drawing duration of each frame of image exceeds the theoretical drawing duration, perform S903.

S903: Obtain current load of an SOC. For a specific implementation, refer to the foregoing embodiments. Details are not described in this step.

S904: Determine whether the current load of the SOC exceeds a second preset threshold. For a specific implementation, refer to the foregoing embodiments. Details are not described in this step.

S905: Single-frame pulse frequency modulation.

In specific implementation, CPU and DDR frequency setting interfaces provided by an Android system may be invoked, to lock operating frequencies of the CPU and the DDR to a theoretical maximum frequency, and restore to operating frequencies before adjustment after a period of time, where the period of time may be 4 ms, or may be the theoretical drawing duration. For example, for a game with a maximum frame rate of 60 fps, the theoretical drawing duration may be 16.6 ms. For a specific implementation, refer to the foregoing embodiments. Details are not described in this step. After the single-frame pulse frequency modulation is completed, S902 is performed to determine whether actual drawing duration of a next frame of image exceeds the theoretical drawing duration.

Figure 10:
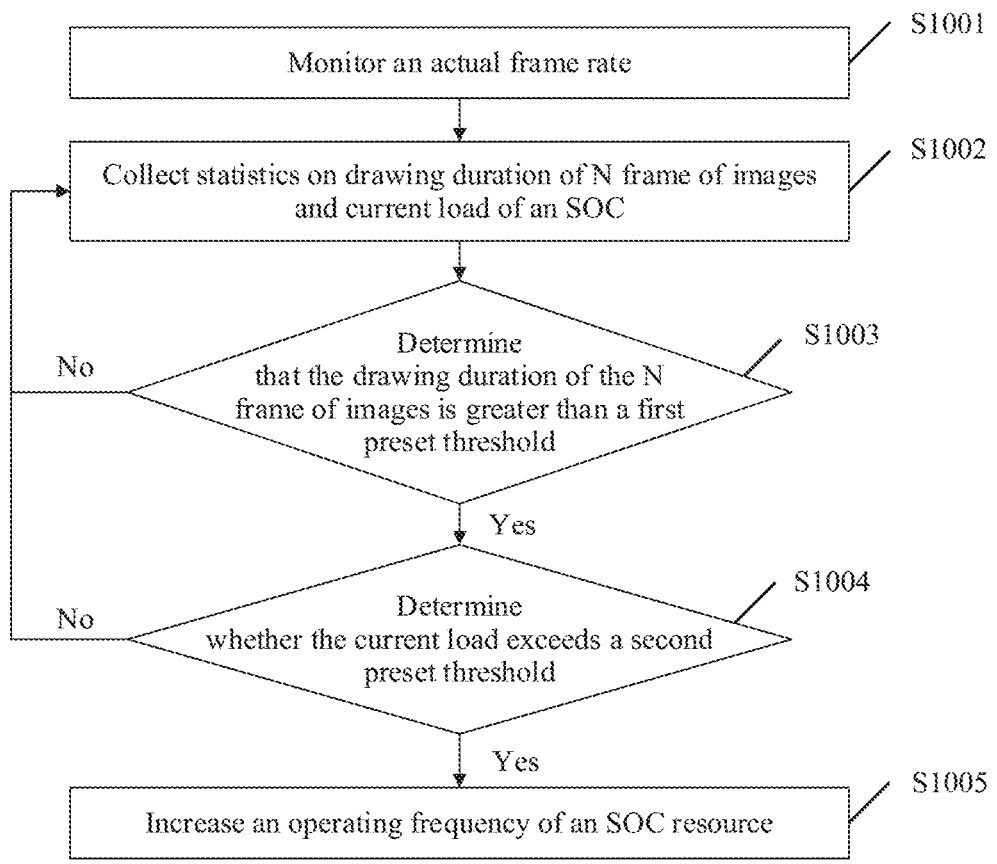
FIG. 10 is a schematic flowchart of still another frequency adjustment method applied to a terminal according to an embodiment of this application.

FIG. 10 is a schematic flowchart of still another frequency adjustment method applied to a terminal according to an embodiment of this application. As shown in the figure, steps in this embodiment of this application include at least the following;

S1001: Monitor an actual frame rate. For a specific implementation, refer to the foregoing embodiments. Details are not described in this step.

S1002: Obtain a sum of actual drawing duration of N frame of images, and determine current load of an SOC when each of the N frame of images is drawn. For a specific implementation, refer to the foregoing embodiments. Details are not described in this step.

S1003: Determine whether the sum of the actual drawing duration of the N frame of images is greater than a first preset threshold, and if the sum of the actual drawing duration of the N frame of images is greater than the first preset threshold, and the actual drawing duration of the N frame of images is in an increasing trend, perform S1004. If the sum of the actual drawing duration of the N frame of images is not greater than the first preset threshold, or the actual drawing duration of the N frame of images is not in the increasing trend, step S1002 is performed. The first preset threshold may be the theoretical drawing duration 16.6 ms×N, where N may be 3, 4, 5, or the like.

S1004: Determine whether the current load of the SOC is greater than a second preset threshold, and if the current load of the SOC is greater than the second preset threshold, perform S1005; or if the current load of the SOC is not greater than the second preset threshold, perform S1002 to perform step S1002. The second preset threshold may be 70%.

S1005: Increase an operating frequency of the SOC. For a specific implementation, refer to the method in S811 in the foregoing embodiment. Details are not described in this step.

Figure 11:
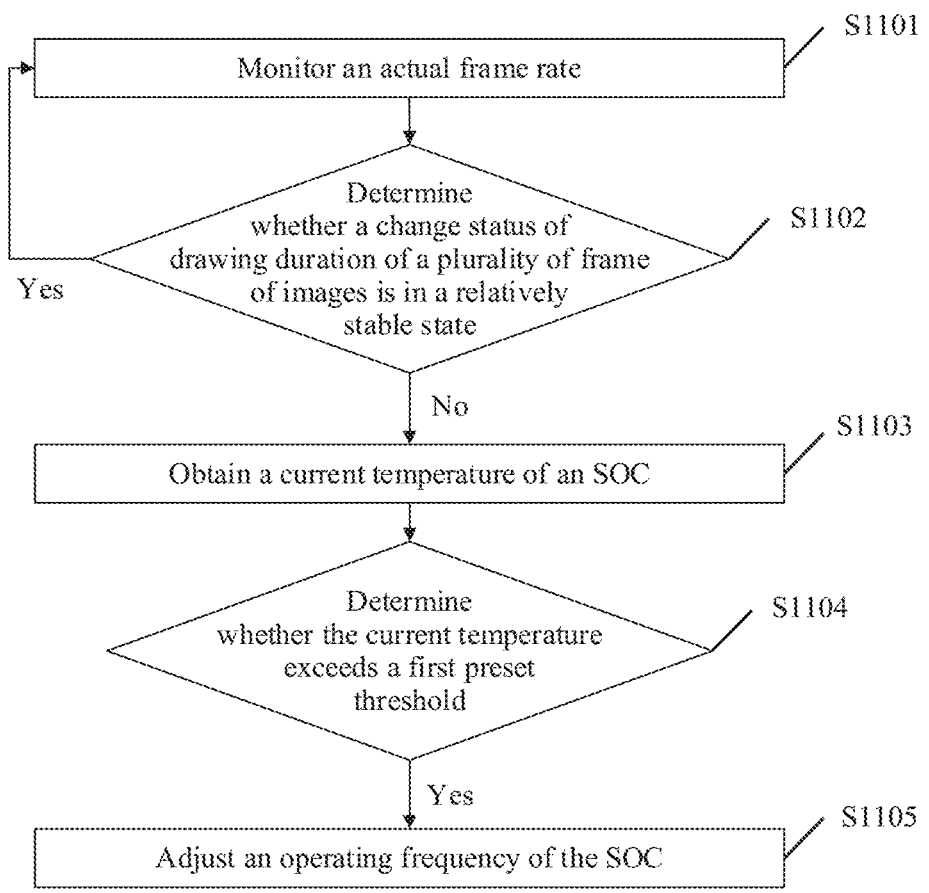
FIG. 11 is a schematic flowchart of still another frequency adjustment method applied to a terminal according to an embodiment of this application.

FIG. 11 is a schematic flowchart of still another frequency adjustment method according to an embodiment of this application. As shown in the figure, steps in this embodiment of this application include at least the following:

S1101: Monitor an actual frame rate. For a specific implementation, refer to the foregoing embodiments. Details are not described in this step.

S1102: Determine whether actual drawing duration of a plurality of frame of images is in a relatively stable state. If the actual drawing duration of the plurality of frame of images is in the relatively stable state, perform S1101. If the actual drawing duration of the plurality of frame of images is not in the relatively stable state, perform S1103. For a specific implementation, refer to the foregoing embodiments. Details are not described in this step.

S1103: Obtain a current temperature of an SOC. For a specific implementation, refer to the foregoing embodiments. Details are not described in this step.

S1104: Determine whether the current temperature exceeds a first preset threshold. The first preset threshold may be a maximum temperature of the SOC when a frame rate is maintained, for example, 39 degrees Celsius or 40 degrees Celsius. If the current temperature exceeds the first preset threshold, S1105 is performed.

S1105: Adjust an operating frequency of the SOC, and reduce the operating frequency or current load of the SOC. For a specific implementation, refer to the foregoing embodiments. Details are not described in this step.

Figure 12:
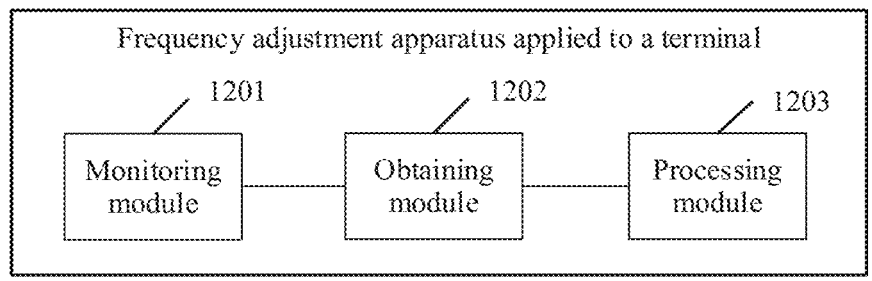
FIG. 12 is a schematic structural diagram of a frequency adjustment apparatus applied to a terminal according to an embodiment of this application.

FIG. 12 is a frequency adjustment apparatus applied to a terminal according to an embodiment of this application. The apparatus in this embodiment of this application may include at least the following:

a monitoring module 1201, configured to monitor a drawing time of a first frame of image;

an obtaining module 1202, configured to obtain a current state of a system on chip SOC when the drawing time exceeds first drawing duration, where the current state is any one or more of the following parameters:

a current temperature of the SOC and current load of the SOC: and a processing module 1203, configured to determine whether the current state exceeds a first preset threshold, where the processing module 1203 is further configured to: if the current state does not exceed the first preset threshold, increase an operating frequency of the SOC in a time range, and restore the operating frequency after the increasing of the operating frequency ends;

the obtaining module 1202 is further configured to obtain actual drawing duration of the first frame of image when drawing of the first frame of image is completed: and the monitoring module 1201 is further configured to monitor a drawing time of a second frame of image when the actual drawing duration does not exceed second drawing duration, where the second drawing duration is determined based on a preconfigured maximum frame rate, and the first drawing duration is less than the second drawing duration.

The time range is a preset time period, or the time range is duration from a start time point of increasing the operating frequency of the SOC to an end time point of drawing the first frame of image.

The processing module 1203 is further configured to: when the current state exceeds the first preset threshold, after the drawing of the first frame of image is completed, delay preset duration to notify an application that the drawing of the first frame of image is completed.

The obtaining module 1202 is further configured to: when the actual drawing duration exceeds the second drawing duration, obtain a sum of first duration of the second frame of image to an $N^{th}$ frame of image, a sum of second duration of an $(N+1)^{th}$ frame of image to a $(2N-1)^{th}$ frame of image, and the current load of the SOC, where N is a positive integer greater than 2.

The processing module 1203 is further configured to increase the operating frequency of the SOC when a value obtained by subtracting the sum of the first duration from the sum of the second duration is greater than a second preset threshold, and the current load is greater than a third preset threshold.

The first drawing duration is 13 ms or 15 ms, and the first preset threshold is 70% or 80%.

It should be noted that, for implementation of modules, refer to corresponding descriptions of the method embodiments shown in FIG. 3 to FIG. 11. The modules perform the methods and the functions performed by the electronic device in the foregoing embodiments.

Figure 13:
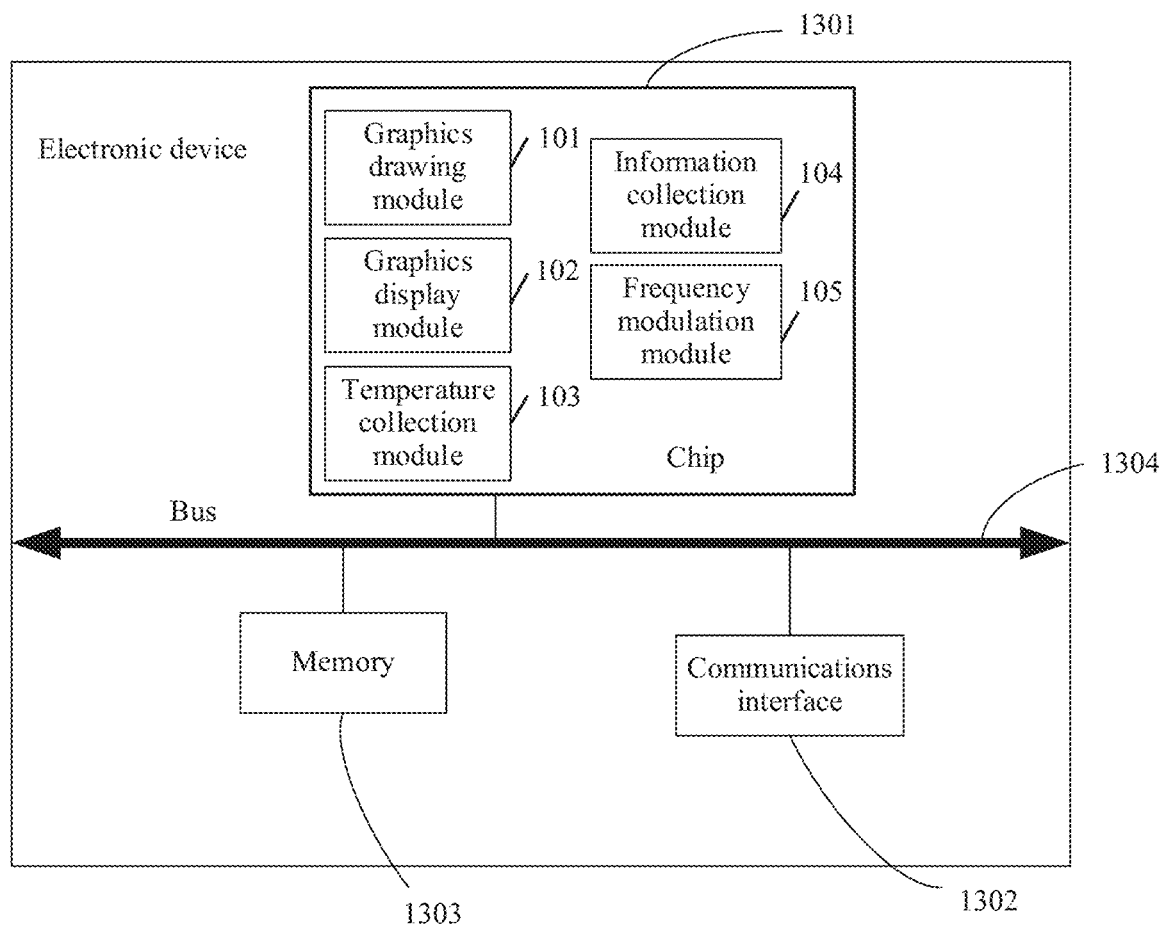
FIG. 13 is a schematic structural diagram of an electronic device according to an embodiment of this application.

FIG. 13 is a schematic structural diagram of an electronic device according to an embodiment of this application. As shown in FIG. 13, the electronic device 1301 may include at least one processor 1301, at least one communications interface 1302, at least one memory 1303, and at least one communications bus 1304. The processor 1301 may include a graphics drawing module 101, an image display module 102, a temperature collection module 103, an information collection module 104, a frequency modulation module 105, and the like. Certainly, in some implementations, the processor and the memory may be further integrated. The electronic device may be a chip.

The processor 1301 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications bus 1304 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 13, but this does not mean that there is only one bus or only one type of bus. The communications bus 1304 is configured to implement connection and communication between these components. The communications interface 1302 in the device in this embodiment of this application is configured to perform signaling or data communication with another node device. The memory 1303 may include a volatile memory, for example, a nonvolatile dynamic random access memory (nonvolatile random access memory, NVRAM), a phase-change random access memory (phase-change RAM, PRAM), or a magnetoresistive random access memory (magnetoresistive RAM, MRAM). The memory 1303 may further include a nonvolatile memory, for example, at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), or a semiconductor device such as a solid-state drive (solid-state drive, SSD). Optionally, the memory 1303 may alternatively be at least one storage apparatus far away from the processor 1301. Optionally, the memory 1303 may further store a group of program code, and optionally, the processor 1301 may further execute a program executed in the memory 1303.

The processor 1301 is configured to perform the following operations: monitoring a drawing time of a first frame of image;

obtaining a current state of a system on chip SOC when the drawing time exceeds first drawing duration, where the current state is any one or more of the following parameters:

a current temperature of the SOC and current load of the SOC; and determining whether the current state exceeds a first preset threshold;

if the current state does not exceed the first preset threshold, increasing an operating frequency of the SOC in a time range, and restoring the operating frequency after the increasing of the operating frequency ends;

obtaining actual drawing duration of the first frame of image when drawing of the first frame of image is completed; and monitoring a drawing time of a second frame of image when the actual drawing duration does not exceed second drawing duration, where the second drawing duration is determined based on a preconfigured maximum frame rate, and the first drawing duration is less than the second drawing duration.

The time range is a preset time period, or the time range is duration from a start time point of increasing the operating frequency of the SOC to an end time point of drawing the first frame of image.

Optionally, the processor 1301 is further configured to perform the following operations:

when the current state exceeds the first preset threshold, after the drawing of the first frame of image is completed, delaying preset duration to notify an application that the drawing of the first frame of image is completed.

Optionally, the processor 1301 is further configured to perform the following operations:

when the actual drawing duration exceeds the second drawing duration, obtaining a sum of first duration of the second frame of image to an $N^{th}$ frame of image, a sum of second duration of an $(N+1)^{th}$ frame of image to a $(2N-1)^{th}$ frame of image, and the current load of the SOC, where N is a positive integer greater than 2; and increasing the operating frequency of the SOC when a value obtained by subtracting the sum of the first duration from the sum of the second duration is greater than a second preset threshold, and the current load is greater than a third preset threshold.

The first drawing duration is 13 ms or 15 ns, and the first preset threshold is 70% or 80%.

Further, the processor may further cooperate with the memory and the communications interface to perform the operations of the frequency adjustment apparatus applied to a terminal in the foregoing embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A method comprising:
    monitoring a first drawing time of a first frame of an image;
    obtaining a current state of a system on chip (SOC) when the first drawing time exceeds a first drawing duration, wherein the current state comprises a current temperature of the SOC and/or a current load of the SOC;
    determining whether the current state exceeds a first preset threshold;
    when the current state does not exceed the first preset threshold,
        increasing an operating frequency of the SOC in a time range; and
        restoring the operating frequency after increasing the operating frequency ends;
    obtaining an actual drawing duration of the first frame when drawing the first frame is completed; and
    monitoring a second drawing time of a second frame of the image when the actual drawing duration does not exceed a second drawing duration,
    wherein the second drawing duration is based on a preconfigured maximum frame rate, and
    wherein the first drawing duration is less than the second drawing duration.

2. The method of claim 1, wherein the time range is a preset time period.

3. The method of claim 1, further comprising delaying a preset duration to notify an application that drawing the first frame is completed when the current state exceeds the first present threshold.

4. The method of claim 1, further comprising:
    obtaining a first sum of first duration of the second frame to an $N^{th}$ frame of the image, a second sum of second duration of an $(N+1)^{th}$ frame of the image to a $(2N-1)^{th}$ frame of the image, and the current load when the actual drawing duration exceeds the second drawing duration, wherein N is a positive integer greater than 2;
    subtracting the first sum from the second sum to obtain a value; and
    increasing the operating frequency when the value is greater than a second preset threshold and the current load is greater than a third preset threshold.

5. The method of claim 1, wherein the first drawing duration is 13 milliseconds (ms), and wherein the first preset threshold is 70%.

6. The method of claim 1, wherein the time range comprises a start time point of increasing the operating frequency to an end time point of drawing the first frame.

7. The method of claim 1, wherein the first drawing duration is 13 milliseconds (ms), and wherein the first preset threshold is 80%.

8. The method of claim 1, wherein the first drawing duration is 15 milliseconds (ms), and wherein the first preset threshold is 70%.

9. The method of claim 1, wherein the first drawing duration is 15 milliseconds (ms), and wherein the first preset threshold is 80%.

10. An apparatus comprising:
    a memory configured to store instructions; and
    a processor coupled to the memory, wherein the instructions cause the processor to be configured to:
        monitor a first drawing time of a first frame of an image;
        obtain a current state of a system on chip (SOC) when the first drawing time exceeds a first drawing duration, wherein the current state comprises a current temperature of the SOC and/or a current load of the SOC;
        determine whether the current state exceeds a first preset threshold;
        when the current state does not exceed the first preset threshold;
            increase an operating frequency of the SOC in a time range; and
            restore the operating frequency after increasing the operating frequency ends;
        obtain an actual drawing duration of the first frame when drawing the first frame is completed; and
        monitor a second drawing time of a second frame of the image when the actual drawing duration does not exceed a second drawing duration,
        wherein the second drawing duration is based on a preconfigured maximum frame rate, and
        wherein the first drawing duration is less than the second drawing duration.

11. The apparatus of claim 10, wherein the time range is a preset time period.

12. The apparatus of claim 10, wherein the instructions further cause the processor to be configured to delay a preset duration to notify an application that drawing the first frame of image is completed when the current state exceed the first present threshold.

13. The apparatus of claim 10, wherein the instructions further cause the processor to be configured to:
    obtain a first sum of first duration of the second frame to an $N^{th}$ frame of the image, a second sum of second duration of an $(N+1)^{th}$ frame of the image to a $(2N-1)^{th}$ frame of image, and the current load when the actual drawing duration exceeds the second drawing duration, wherein N is a positive integer greater than 2;
    subtracting the first sum from the second sum to obtain a value; and
    increase the operating frequency when the value is greater than a second preset threshold and the current load is greater than a third preset threshold.

14. The apparatus of claim 10, wherein the first drawing duration is 13 milliseconds (ms) or 15 ms, and wherein the first preset threshold is 70% or 80%.

15. The apparatus of claim 10, wherein the time range comprises a start time point of increasing the operating frequency to an end time point of drawing the first frame.

16. A computer program product comprising computer-executable instructions stored on a non-transitory computer-readable medium that, when executed by a processor, cause an electronic device to:
    monitor a first drawing time of a first frame of an image;
    obtain a current state of a system on chip (SOC) when the first drawing time exceeds a first drawing duration, wherein the current state comprises a current temperature of the SOC and/or a current load of the SOC;
    determine whether the current state exceeds a first preset threshold;
    when the current state does not exceed the first preset threshold:
        increase an operating frequency of the SOC in a time range; and
        restore the operating frequency after increasing the operating frequency ends;
    obtain an actual drawing duration of the first frame when drawing of the first frame is completed; and monitor a second drawing time of a second frame of the image when the actual drawing duration does not exceed a second drawing duration, wherein the second drawing duration is based on a preconfigured maximum frame rate, and wherein the first drawing duration is less than the second drawing duration.

17. The computer program product of claim 16, wherein the time range is either a preset time period or from a start time point of increasing the operating frequency to an end time point of drawing the first frame.

18. The computer program product of claim 16, wherein the computer-executable instructions further cause the electronic device to delay a preset duration to notify an application that drawing the first frame of image is completed when the current state exceeds the first preset threshold.

19. The computer program product of claim 16, wherein the computer-executable instructions further cause the electronic device to:

obtain a first sum of first duration of the second frame to an N frame of the image, a second sum of second duration of an $(N+1)^{th}$ frame of the image to a $(2N-1)^{th}$ frame of the image, and the current load when the actual drawing duration exceeds the second drawing duration, wherein N is a positive integer greater than 2;

subtracting the first sum from the second sum to obtain a value; and increase the operating frequency when the value is greater than a second preset threshold and the current load is greater than a third preset threshold.

20. The computer program product of claim 16, wherein the first drawing duration is 13 milliseconds (ms) or 15 ms, and wherein the first preset threshold is 70% or 80%.

* * * * *

UNITED STATES PATENT AND TRADEMARK OFFICE
CERTIFICATE OF CORRECTION

PATENT NO. : 11,430,358 B2
APPLICATION NO. : 17/598024
DATED : August 30, 2022
INVENTOR(S) : Xin Yao, Chengzhen Wan and Gang Li It is certified that error appears in the above-identified patent and that said Letters Patent is hereby corrected as shown below:

On the Title Page

(57) Abstract should read: "A method comprises monitoring a drawing time of a first frame of image, obtaining a current state of a system on chip (SOC) when the drawing time exceeds a first drawing duration, where the current state comprises a current temperature of the SOC and/or a current load of the SOC, determining whether the current state exceeds a first preset threshold, when the current state does not exceed the first preset threshold, increasing an operating frequency of the SOC in a time range, and restoring the operating frequency after the increasing of the operating frequency ends, obtaining actual drawing duration of the first frame of the image when drawing of the first frame of the image is completed, and monitoring a drawing time of a second frame of the image when the actual drawing duration does not exceed second drawing duration."

In the Claims

Claim 1, Column 29, Line 12: "threshold," should read "threshold:"

Claim 10, Column 30, Line 7: "threshold;" should read "threshold:"

Claim 13, Column 30, Line 37: "greater than 2," should read "greater than 2;"

Claim 19, Column 32, Line 5: "an N frame" should read "an Nth frame"

Signed and Sealed this
Twenty-fifth Day of October, 2022

Katherine Kelly Vidal
*Director of the United States Patent and Trademark Office*